United States Patent [19]

Hoff et al.

[11] Patent Number: 5,058,467
[45] Date of Patent: Oct. 22, 1991

[54] QUICK CHANGE COLLET STOP

[75] Inventors: Steven R. Hoff, New Haven, Ind.; Norman M. Fuller, Antwerp, Ohio

[73] Assignee: Dana Corporation, Toledo, Ohio

[21] Appl. No.: 495,848

[22] Filed: Mar. 19, 1990

[51] Int. Cl.[5] .................... B23B 31/20; B23B 13/12
[52] U.S. Cl. .................................. 82/153; 279/1 S; 279/1 E; 279/51
[58] Field of Search ............... 279/1 S, 46, 47, 48, 279/51, 1 E; 82/153, 155

[56] References Cited

U.S. PATENT DOCUMENTS

| | | | |
|---|---|---|---|
| 1,014,051 | 1/1912 | De Long | 84/142 |
| 2,396,504 | 3/1946 | Grey | 279/46 |
| 2,398,278 | 4/1948 | Bailey | 279/46 R |
| 2,423,551 | 7/1947 | Caffin | 279/46 |
| 2,469,160 | 5/1949 | Evans | 279/51 |
| 2,502,719 | 4/1950 | Haley et al. | 279/46 |
| 2,515,289 | 7/1950 | Bergmann | 279/46 |
| 2,676,810 | 4/1954 | Landreth | 279/46 |
| 2,756,059 | 7/1956 | Knapp | 279/1 S |
| 2,771,297 | 11/1956 | Nipken | 279/102 |
| 2,922,656 | 1/1960 | Belloli | 279/46 |
| 2,965,381 | 12/1960 | Meyer | 279/46 |
| 3,115,798 | 12/1963 | Donaway | 82/155 |
| 3,124,025 | 3/1964 | Bohnet | 82/153 |
| 3,360,276 | 12/1967 | Peffer | 279/2 |
| 3,385,607 | 5/1968 | Hughes | 279/51 |
| 3,542,384 | 11/1970 | Speed | 279/46 |
| 3,599,997 | 8/1971 | Oliver | 279/1 S |
| 3,615,101 | 10/1971 | Oliver | 279/1 S |
| 3,719,367 | 3/1973 | Baturka | 279/1 A |
| 3,765,074 | 10/1973 | Payne | 29/203 |
| 3,779,566 | 12/1973 | Tarbox et al. | 279/1 S |
| 3,876,214 | 4/1975 | Blanchard | 279/1 S |
| 4,057,259 | 11/1977 | Pesanté | 279/1 S |
| 4,418,592 | 12/1983 | Altman | 82/154 |
| 4,505,487 | 3/1985 | Davignon et al. | 279/1 S |
| 4,552,370 | 11/1985 | Baumgartner | 279/1 S |
| 4,955,622 | 9/1990 | Peterson | 279/46 R |

OTHER PUBLICATIONS

Handbook for Operators—Acme-Gridley Multiple Spindle Bar Machines (1980).

Primary Examiner—Larry I. Schwartz
Assistant Examiner—Kevin J. Carroll
Attorney, Agent, or Firm—MacMillan, Sobanski & Todd

[57] ABSTRACT

A collet stop for positively positioning a workpiece within a collet of a spindle in a multiple spindle lathe is disclosed. An adapter block having a counterbore is secured within the spindle. The collet stop is provided with a body portion, which is adapted to be engaged by the workpiece during use, and a neck portion. The neck portion is sized to be received within the counterbore of the adapter block. A bore is formed through the neck portion. The end of the neck portion is split to define a plurality of flexible fingers. A threaded fastener extends through the bore into cooperation with a tapered lock nut. By tightening the threaded fastener, the lock nut is drawn within the neck portion so as to spread the fingers radially outwardly into frictional engagement with the adapter block counterbore. A plurality of differently sized collet stops are provided for workpieces having different sizes or shapes. The collet stop is quickly and easily changeable with similar collet stops of varying size.

15 Claims, 2 Drawing Sheets

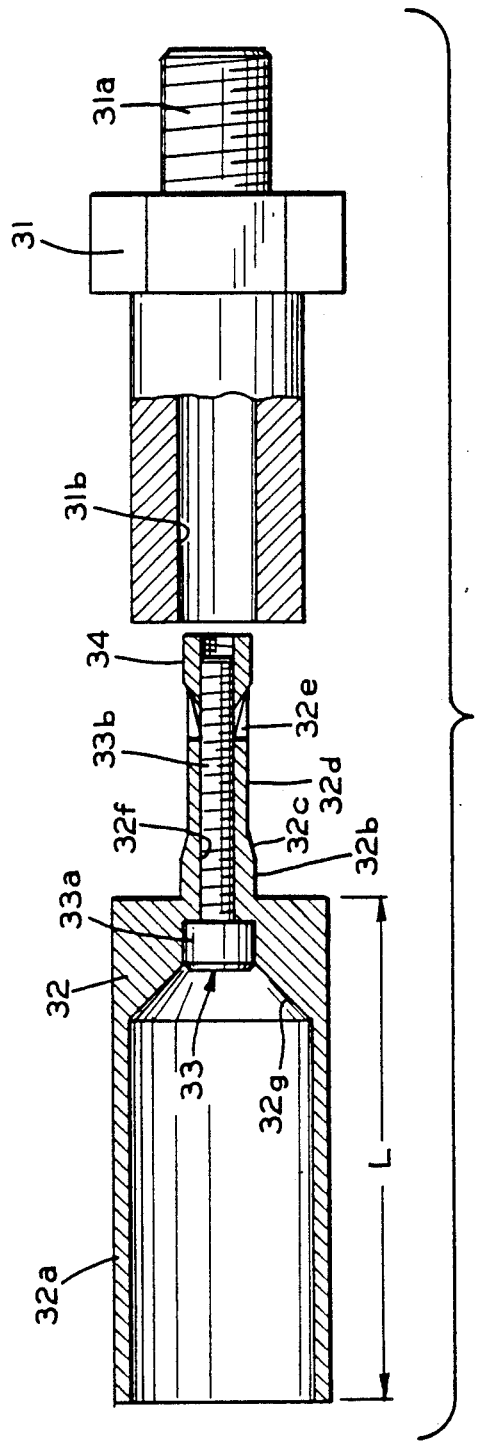
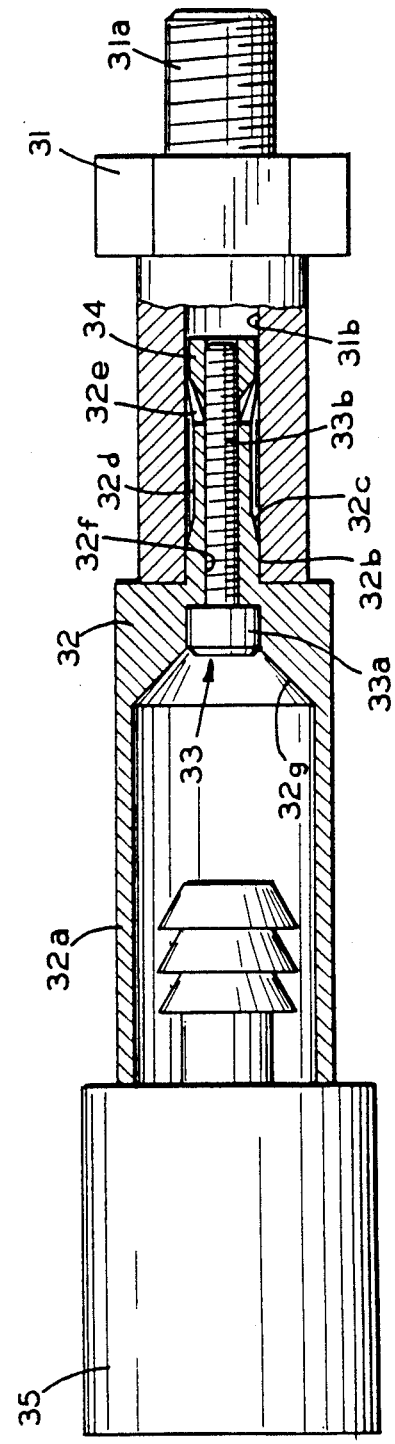
FIG. 4
FIG. 5

QUICK CHANGE COLLET STOP

BACKGROUND OF THE INVENTION

This invention relates in general to workpiece clamping collets for use in multiple spindle lathes and in particular to a collet stop for positively positioning a workpiece within such a collet which is quickly and easily changeable with similar stops of varying size.

The multiple spindle lathe is a commonly known machine tool which is designed to support a plurality of workpieces simultaneously and to selectively remove material therefrom. To accomplish this, the spindle lathe is provided with a plurality of workpiece supporting spindles. Typically, four, six, or eight of such spindles are mounted in a circular array on a carrier assembly. The carrier assembly is rotatably supported on a frame of the spindle lathe. Means are provided for selectively rotating the carrier assembly so as to index each of the spindles through a plurality of operating positions.

At each of the carrier assembly operating positions, the spindles (and the workpieces supported therein) are aligned with one or more machine tools mounted on the spindle lathe. While so aligned, the machine tools are moved into engagement with the workpiece so as to remove material therefrom. When the material removal processes at each of the spindles are completed, the carrier assembly is indexed to the next operating position, where similar material removals occur. Thus, as a workpiece is sequentially indexed through each of the operating positions, material is removed therefrom to transform raw stock material into a finished workpiece.

In order to releasably engage and support the workpieces during the above-described machining process, each of the spindles is provided with a conventional clamping collet or chuck. The collet is opened to permit a finished workpiece to be removed and an unfinished workpiece to be inserted therein, and closed to engage the workpiece and and support it therein during machining at the various operating positions. A stop mechanism is usually provided on the spindle lathe for accurately positioning an unfinished workpiece axially within the collet before it is closed. Frequently, the stop mechanism (referred to as the collet stop) is located within the collet itself. Thus, when the collet is opened and the workpiece is inserted therein, the leading edge of the workpiece moves axially within the collet until it engages the collet stop. At that point, the collet is closed, thereby engaging and supporting the workpiece in a desired position relative to the collet.

Unfortunately, when the collet stop is located within the collet, it is difficult to gain access thereto. Such access is required when it is desired to change the relative position of the collet stop within the collet or to replace it with a differently sized collet stop. This changing of position or replacement of the collet stop is necessary when workpieces of different size or shape are to be machined on the spindle lathe. The lack of easy access causes the collet stop changeover operation to be tedious and time consuming, which is particularly significant if only small volumes of workpieces are to be machined. Known collet stops of this general type can require as much as forty minutes to complete a changeover operation. Thus, it would be desirable to provide an improved collet stop structure which can be changed in a quick and easy fashion.

SUMMARY OF THE INVENTION

This invention relates to a collet stop for positively positioning a workpiece within a collet of a spindle in a multiple spindle lathe which is quickly and easily changeable with similar collet stops of varying size. An adapter block having an elongated counterbore is secured within the spindle. The collet stop is provided with a body portion, which is adapted to be engaged by the workpiece during use, and a neck portion, which is adapted to connect the collet stop to the adapter. The neck portion is sized to be received within the counterbore of the adapter block. A bore is formed through the neck portion. The end of the neck portion is split to define a plurality of flexible fingers. A threaded fastener extends through the bore into cooperation with a tapered lock nut. By tightening the threaded fastener, the lock nut is drawn within the neck portion so as to spread the fingers radially outwardly into frictional engagement with the adapter block counterbore. A plurality of differently sized collet stops are provided for workpieces having different sizes or shapes.

It is an object of this invention to provide an improved collet stop for positively positioning a workpiece within a collet of a spindle in a multiple spindle lathe.

It is another object of this invention to provide such an improved collet stop which is quickly and easily changeable with similar collet stops of varying size.

It is a further object of this invention to provide such an improved collet stop which is simple and inexpensive in construction and operation.

Other objects and advantages of this invention will become apparent to those skilled in the art from the following detailed description of the preferred embodiment, when read in light of the accompanying drawings.

BRIEF DESCRIPTION OF THE DRAWINGS

FIG. 4 is an enlarged exploded view of the collet stop and adapter block shown in FIGS. 2 and 3.

FIG. 5 is an enlarged view showing the collet stop secured to the adapter block.

DETAILED DESCRIPTION OF THE PREFERRED EMBODIMENT

Figure 1:
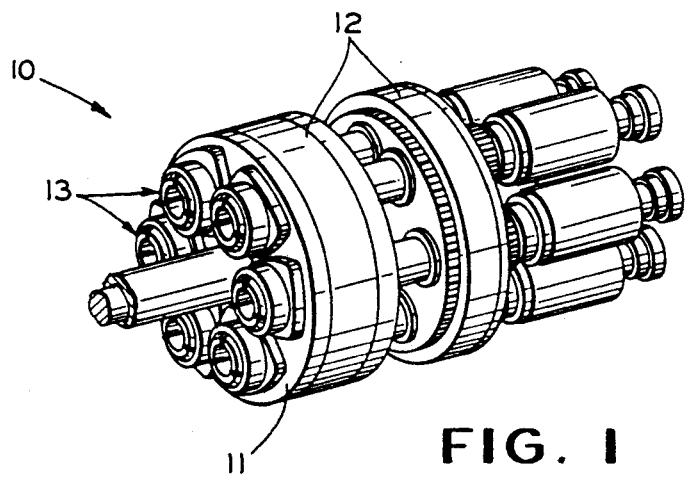
FIG. 1 is a perspective view of the carrier assembly portion of a conventional multiple spindle lathe.

Referring now to the drawings, there is illustrated in FIG. 1 a carrier assembly portion of a conventional multiple spindle lathe, indicated generally at 10. The spindle lathe 10 is conventional in the art, and the structure and operation thereof will be explained only to the extent necessary to achieve an understanding of this invention. A more detailed explanation of the overall structure and operation of the spindle lathe 10 can be found in the Handbook For Operators for the Acme-Gridley Multiple Spindle Bar Machine published in 1980, the disclosure of which is incorporated herein by reference.

The spindle lathe 10 includes a carrier assembly 11. The carrier assembly 11 is mounted for rotation within two annular carrier journals 12 housed in a frame (not shown) of the spindle lathe 10. A motor or similar means (not shown) is provided for selectively rotating the carrier assembly 11 within the journals 12. A plurality of workpiece supporting spindles 13 (six in the illustrated embodiment) are mounted in a circular array in the carrier assembly 11. Each of the spindles 13 is rotatable relative to the carrier assembly 11.

Figure 2:
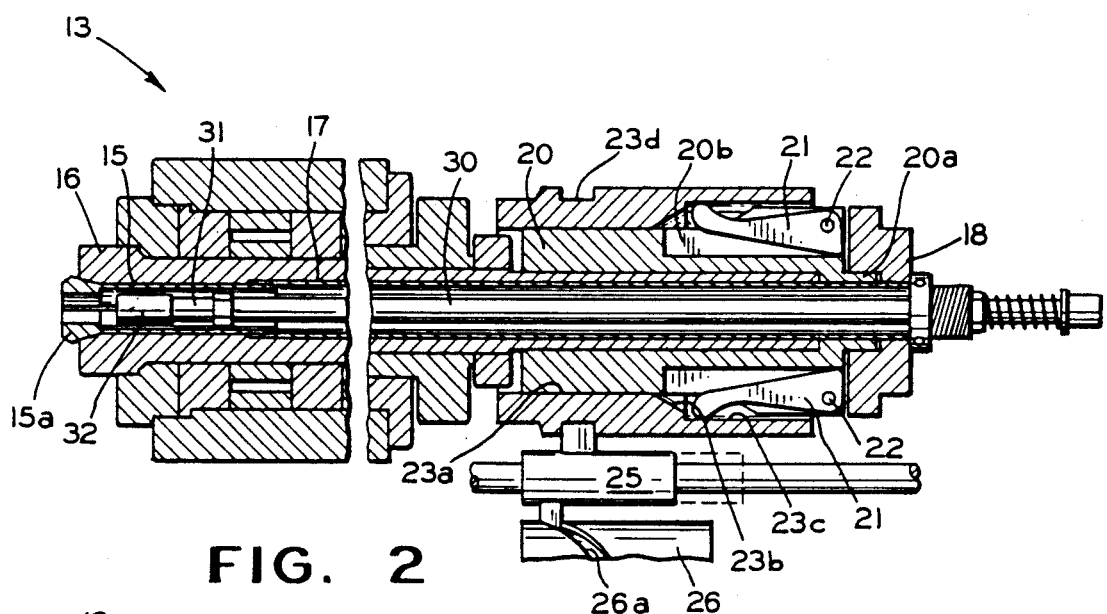
FIG. 2 is a side elevational view of one of the spindles contained in the carrier assembly illustrated in FIG. 1 including a collet stop and an adapter block in accordance with this invention, the collet of the spindle being shown in an opened position.
Figure 3:
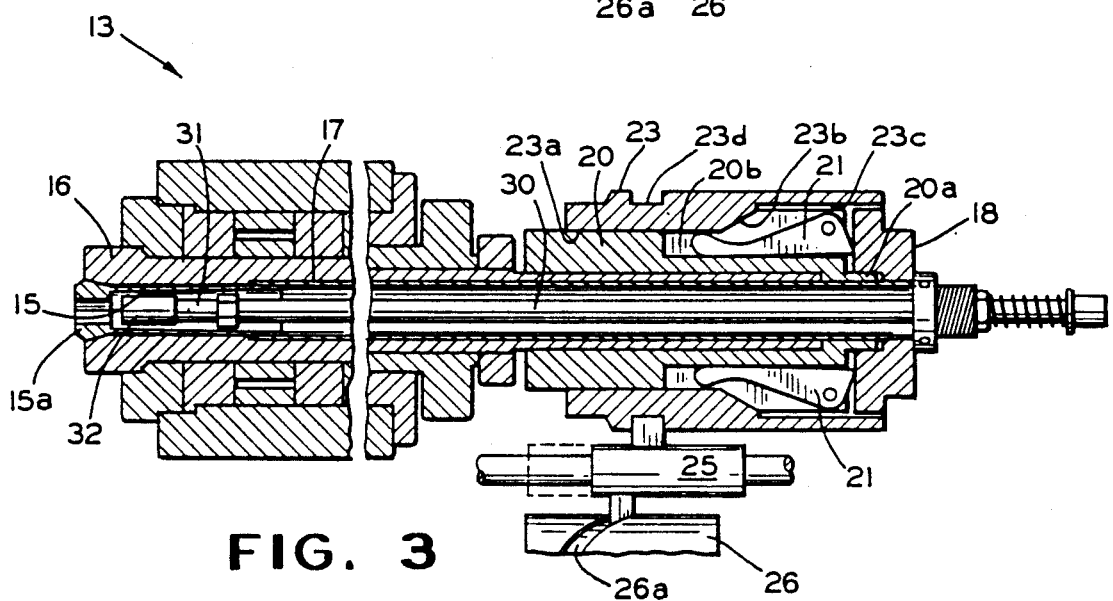
FIG. 3 is a side elevational view similar to FIG. 2 showing the collet of the spindle in a closed position.

Referring to FIGS. 2 and 3, the structure of one of the spindles 13 is illustrated in detail. The spindle 13 includes a conventional clamping collet or chuck 15 which extends out of the forward end thereof. For the purposes of this discussion, the term "forward" refers to the left side of FIGS. 2 through 5, while the term "rearward" refers to the right side. The collet 15 is generally hollow and cylindrical in shape, including an outer end formed having a plurality of flexible clamping fingers 15a. The collet fingers 15a have tapered outer surfaces which cooperate with a tapered opening formed in a collar 16. Thus, as is well known, when the collet 15 is moved forwardly, the fingers 15a spread apart to permit the insertion and moved rearwardly, the fingers 15a are pushed together by the collar 16 to clamp radially inwardly upon an enclosed workpiece.

The rearward end of the collet 15 is threaded onto the forward end of a collet tube 17. The collet tube 17 extends axially rearwardly through the spindle 13 and is connected to a collet actuator plate 18. The collet actuator plate 18 is supported for limited axial movement on a rearwardly extending protrusion 20a of a generally cylindrical housing 20 of the spindle 13. Means (not shown) are provided for urging the collet actuator plate 18 toward the forward end of the spindle 13. A plurality of pivotable secured within respective slots 20b levers 21 are pivotably secured within respective slots 20b formed in the housing 20 by pivot pins 22. The rearward ends of the levers 21 engage the forward end of the collet actuator plate 18. Thus, when the levers 21 are pivoted to a first position (as shown in FIG. 2), the collet actuator plate 18 is urged forwardly, causing the collet 15 to be opened. However, when the levers 21 are pivoted to a second position (as shown in FIG. 3), the collet actuator plate 18 is urged rearwardly, causing the collet 15 to be closed.

A hollow cylindrical spool 23 is provided to selectively pivot the levers 21 between their first and second positions. The spool 23 has an inner surface diameter portion 23a, a tapered defined by a smaller diameter portion 23a, a tapered portion 23b, and a larger diameter portion 23c. The smaller diameter portion 23a is journalled on the spindle housing 20 for axial movement relative thereto. The forward ends of the levers 21 are in engagement with this inner surface. An annular groove 23d is formed in the outer surface of the spool 23. A collet operating slide 25 is provided with a fork portion which extends into the groove 23d. The collet operating slide 25 cooperates with a cam mechanism 26 having a serpentine groove 26a formed therein. As will be readily appreciated, rotation of the cam mechanism 26 to the position illustrated in FIG. 2 causes the collet operating slide 25 to move the spool 23 forwardly. As a result, the levers 21 pivot so as to move the collet actuating plate forwardly and open the collet 15. Similarly, rotation of the cam mechanism 26 to the position illustrated in FIG. 3 causes the collet operating slide 25 to move the spool 23 rearwardly and close the collet 15.

A spring loaded ejector post 30 is connected to the collet actuator plate 18 for movement therewith. The ejector post 30 extends axially forwardly through the spindle 13 into the collet 15. An adapter block 31 is secured to the forward end of the ejector post 30 within the collet 15. As will be explained in greater detail below, a collet stop 32 is releasably connected to the adapter block 31. The collet stop 32 provides a positive stop for engagement by a workpiece inserted into the forward end of the collet 15.

Referring now to FIGS. 4 and 5, the structures of the adapter block 31 and the collet stop 32 are illustrated in detail. The adapter block 31 includes a threaded rearward end portion 31a. The end portion 31a is threaded into the forward end of the ejector post 30 to secure the adapter block 31 thereto as described above. The adapter block 31 further includes a forwardly extending end portion having a counterbore 31b formed therein. The counterbore 31b defines an inner diameter.

The collet stop 32 is formed having a generally hollow cylindrical body 32a. The body 32a has a predetermined axial length, designated as "L" in FIG. 4. The forward end of the body 32a is opened, while the rearward end is closed. The collet stop 32 further includes an integral elongated neck extending rearwardly from the body 32a. The neck includes a larger diameter forward portion 32b located adjacent to the body 32a, a tapered portion 32c, and a smaller diameter rearward portion 32d. The rearward end of the neck 32b is split to define a plurality of flexible fingers 32e. As best shown in FIG. 4, the inner surfaces of the fingers 32e are slightly tapered and face rearwardly. A co-axial bore 32f is formed through the closed end of the body 32a and through the neck.

As shown in FIG. 5, the neck is sized to be received within the counterbore 31b. The larger diameter portion 32b of the neck is approximately the same size as the inner diameter of the adapter block counterbore 31b. When the neck of the collet stop 32 is inserted within the counterbore 31b, the tapered portion 32c guides the larger diameter portion 32b therein. Thus, the larger diameter portion 32b precisely pilots the collet stop 32 co-axially with respect to the adapter block 31.

To secure the collet stop 32 to the adapter block 31, a threaded fastener 33 and a lock nut 34 are provided. The threaded fastener 33 has a head 33a, which is disposed in a recess formed in the closed end of the body 32a, and a shank 33b, which extends rearwardly through the neck bore 32f. The lock nut 34 is threaded onto the rearward end of the shank 33b and has a forwardly facing tapered surface. Preferably, the lock nut 34 is initially tightened such that the forwardly facing tapered surface thereof engages the rearwardly facing tapered surfaces of the fingers 32e. Such engagement generates friction between the lock nut 34 and the fingers 32e, which desirably tends to prevent relative rotation for reasons which will become apparent below. The forwardly facing tapered surface of the lock nut 34 is preferably oriented at a greater angle than the rearwardly facing tapered surfaces of the fingers 32e. This orientation results in a line contact between the lock nut 34 and the fingers 32e, thereby increasing the amount of friction therebetween.

When the threaded fastener 33 is rotated in one direction relative to the lock nut 34, the lock nut 34 is drawn axially forwardly within the fingers 32e of the collet stop neck. Consequently, the forwardly facing tapered surface of the lock nut 34 spreads the fingers 32e radially outwardly into frictional engagement with the counterbore 31b of the adapter block 31. In this manner, the collet stop 32 is secured to the adapter block 31 for use. Conversely, when the threaded fastener 33 is rotated in the opposite direction relative to the lock nut 34, the lock nut 34 is moved axially rearwardly within the fingers 32e of the collet stop neck, permitting the fingers 32e to move radially inwardly out of frictional engagement with the counterbore 31b.

Since the opened end of the collet stop 32 faces forwardly, access to the head 33a of the threaded fastener 33 can be made easily through the open collet 15. An appropriate screw driver or similar tool can be inserted through such opened end into cooperation with head 33a. To facilitate such insertion, the inner surface of the closed end of the collet stop 32 is provided with a tapered surface 32g. This tapered surface 32g inclines radially inwardly toward the recess formed in the closed end of the collet stop 32, in which the head 33a of the threaded fastener 33 is disposed. Thus, when the screw driver is inserted within the collet stop 32, the tapered surface 32g automatically guides it into cooperation with the head 33a of the threaded fastener 33.

Accordingly, it can be seen that the collet stop 32 can be quickly and easily installed within the spindle 13 for use. The collet stop 32 is predetermined in size (e.g., the length "L") for use with one or more sizes or shapes of workpieces 35, as shown in FIG. 5. When it is desired to machine workpieces having different sizes or shapes, the illustrated collet stop 32 can be quickly and easily replaced by a differently sized collet stop in the manner described above. Thus, it is contemplated that a plurality of differently sized collets stops be provided, each corresponding to workpieces having particular sizes or shapes. All of such collet stops have the same general structure as the neck of the illustrated collet stop 32, thereby allowing the other collet stops to be installed and removed as described above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A workpiece positioning means for use with a spindle in a spindle lathe, the spindle including an adapter block having a counterbore formed therein, the workpiece positioning means comprising:
   a collet stop including a body portion adapted to be engaged by a workpiece to position it within the spindle and a neck portion sized to be received within the adapter block counterbore, said neck portion including a plurality of flexible fingers; and
   means for selectively moving said fingers radially outwardly when said neck portion is disposed within said counterbore such that said fingers frictionally engage said adapter block to secure said collet stop thereto; said neck portion being fixed in position relative to said body portion during the selective movement of said fingers.

2. The invention defined in claim 1 wherein said means for moving said fingers includes a bore formed through said neck portion, a threaded fastener extending through said bore, and a tapered nut threaded onto said threaded fastener, said tapered nut being engaged with said fingers to selectively move them radially outwardly when said threaded fastener is rotated relative thereto.

3. The invention defined in claim 2 wherein said body portion of said collet stop is hollow and wherein said bore extends into said body portion.

4. The invention defined in claim 3 wherein said threaded fastener includes a head disposed within said body portion and a shank extending through said neck portion, said tapered nut being threaded onto said shank.

5. The invention defined in claim 4 further including means formed on said collet stop for guiding a tool into cooperation with said threaded fastener head.

6. The invention defined in claim 5 wherein said means for guiding includes a closed end formed in said collet stop having a recess formed therein, said bore extending through said closed end portion into said recess, said threaded fastener head being disposed in said recess.

7. The invention defined in claim 6 wherein said closed end further includes a tapered surface for guiding the tool into cooperation with said threaded fastener head.

8. The invention defined in claim 1 wherein said body portion and said neck portion are formed from a single piece of material.

9. A workpiece positioning means for use with a spindle in a spindle lathe, the spindle including an adapter block having a counterbore formed therein, the workpiece positioning means comprising:
   a collet stop including a body portion adapted to be engaged by a workpiece to position it within the spindle and a neck portion sized to be received within the adapter block counterbore, said neck portion including a bore formed therethrough and a plurality of flexible fingers; and
   means for selectively moving said fingers radially outwardly when said neck portion is disposed within said counterbore such that said fingers frictionally engage said adapter block to secure said collet stop thereto, said means for moving said fingers including a threaded fastener extending through said bore and a tapered nut threaded onto said threaded fastener, said tapered nut being engaged with said fingers to selectively move them radially outwardly when said threaded fastener is rotated relative thereto.

10. The invention defined in claim 9 wherein said body portion of said collet stop is hollow and wherein said bore extends into said body portion.

11. The invention defined in claim 10 wherein said threaded fastener includes a head disposed within said body portion and a shank extending through said neck portion, said tapered nut being threaded onto said shank.

12. The invention defined in claim 11 further including means formed on said collet stop for guiding a tool into cooperation with said threaded fastener head.

13. The invention defined in claim 12 wherein said means for guiding includes a closed end formed in said collet stop having a recess formed therein, said bore extending through said closed end portion into said recess, said threaded fastener head being disposed in said recess.

14. The invention defined in claim 13 wherein said closed end further includes a tapered surface for guiding the tool into cooperation with said threaded fastener head.

15. The invention defined in claim 9 wherein said body portion and said neck portion are formed from a single piece of material.

* * * * *